(12) United States Patent
Nicodemus et al.

(10) Patent No.: US 12,315,373 B2
(45) Date of Patent: May 27, 2025

(54) METHOD FOR ASSISTING A MOTOR VEHICLE

(71) Applicant: Robert Bosch GmbH, Stuttgart (DE)

(72) Inventors: Rolf Nicodemus, Bietigheim-Bissingen (DE); Stefan Nordbruch, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 477 days.

(21) Appl. No.: 17/291,462

(22) PCT Filed: Dec. 5, 2019

(86) PCT No.: PCT/EP2019/083809
§ 371 (c)(1),
(2) Date: May 5, 2021

(87) PCT Pub. No.: WO2020/135991
PCT Pub. Date: Jul. 2, 2020

(65) Prior Publication Data
US 2022/0028272 A1    Jan. 27, 2022

(30) Foreign Application Priority Data

Dec. 28, 2018   (DE) .................... 10 2018 251 778.9

(51) Int. Cl.
*G08G 1/16* (2006.01)
*G06V 20/10* (2022.01)
(Continued)

(52) U.S. Cl.
CPC ............. *G08G 1/166* (2013.01); *G06V 20/10* (2022.01); *G08G 1/0116* (2013.01);
(Continued)

(58) Field of Classification Search
CPC .... G08G 1/166; G08G 1/0116; G08G 1/0129; G08G 1/0141; G08G 1/017; G08G 1/164;
(Continued)

(56) References Cited

U.S. PATENT DOCUMENTS

| 2009/0234569 | A1* | 9/2009 | Jansen | G01C 21/3446 |
| | | | | 707/999.102 |
| 2013/0332060 | A1* | 12/2013 | Chowdhary | G06Q 10/087 |
| | | | | 701/300 |

(Continued)

FOREIGN PATENT DOCUMENTS

| CN | 106205172 A | 12/2016 |
| CN | 106608264 A | 5/2017 |

(Continued)

OTHER PUBLICATIONS

International Search Report for PCT/EP2019/083809, Issued Apr. 3, 2020.

*Primary Examiner* — Kito R Robinson
*Assistant Examiner* — Roy Rhee
(74) *Attorney, Agent, or Firm* — NORTON ROSE FULBRIGHT US LLP

(57) ABSTRACT

A method for assisting a motor vehicle during a trip of the motor vehicle within an infrastructure, the trip of the motor vehicle being guided in an at least semiautomated manner. The method includes: receiving regional signals, which represent a first region of the infrastructure monitored using a surround-sensor system; for the motor vehicle approaching the first region, determining if a second region is free of a possible collision object for the motor vehicle at an expected arrival time of the motor vehicle at the first or second region, based on the regional signals; if the second region is free of a possible collision object for the motor vehicle at the expected arrival time, outputting a release signal for trans- (Continued)

mitting to the motor vehicle a communications message, that the second region is free of a possible collision object at the expected arrival time.

7 Claims, 5 Drawing Sheets

(51) Int. Cl.
*G08G 1/01* (2006.01)
*G08G 1/017* (2006.01)
*H04W 4/44* (2018.01)
*H04W 4/90* (2018.01)

(52) U.S. Cl.
CPC ......... *G08G 1/0129* (2013.01); *G08G 1/0141* (2013.01); *G08G 1/017* (2013.01); *G08G 1/164* (2013.01); *H04W 4/44* (2018.02); *H04W 4/90* (2018.02); *G06V 2201/08* (2022.01)

(58) Field of Classification Search
CPC ..... G06V 20/10; G06V 2201/08; H04W 4/44; H04W 4/90
See application file for complete search history.

(56) References Cited

U.S. PATENT DOCUMENTS

| | | | |
|---|---|---|---|
| 2016/0196747 A1* | 7/2016 | Tsyrklevich | G01C 21/3667 |
| | | | 701/532 |
| 2017/0327035 A1 | 11/2017 | Keiser | |
| 2018/0293884 A1* | 10/2018 | Liu | G08G 1/0112 |
| 2018/0304886 A1* | 10/2018 | Tannenbaum | G01S 19/13 |
| 2018/0365999 A1 | 12/2018 | Wiklinska et al. | |
| 2021/0027624 A1* | 1/2021 | Oberdanner | H04W 4/38 |

FOREIGN PATENT DOCUMENTS

| | | | | |
|---|---|---|---|---|
| CN | 108486975 A | | 9/2018 | |
| DE | 10210546 A1 | | 9/2003 | |
| DE | 102014006486 A1 | | 11/2014 | |
| DE | 102015002405 A1 | | 8/2016 | |
| DE | 102016223638 A1 | | 6/2017 | |
| DE | 102016210886 A1 | | 12/2017 | |
| DE | 102017202065 A1 | * | 8/2018 | ............ E04H 6/422 |
| KR | 101414571 B1 | | 8/2014 | |
| WO | 2012018109 A1 | | 2/2012 | |
| WO | 2017041941 A1 | | 3/2017 | |

\* cited by examiner

METHOD FOR ASSISTING A MOTOR VEHICLE

FIELD

The present invention relates to a method for assisting a motor vehicle in the case of a vehicle of the motor vehicle within an infrastructure; the vehicle being guided in an at least semiautomated manner. In addition, the present invention relates to a device, a computer program, as well as a machine-readable storage medium.

BACKGROUND INFORMATION

German Patent Application No. DE 102 10 546 A1 describes a method and a system for driving a vehicle automatically.

PCT Patent Application WO 2017/041941 A1 describes a method and a device for operating a motor vehicle traveling driverlessly within a parking lot.

SUMMARY

An object of the present invention is to provide efficient assisting of a motor vehicle during a trip of the motor vehicle within an infrastructure; the trip of the motor vehicle being guided in at least semiautomated manner.

The object may be achieved with the aid of the example embodiments of the present invention. Advantageous refinements and embodiment of the present invention are disclosed herein.

According to a first aspect of the present invention, a method is provided for assisting a motor vehicle during a trip of the motor vehicle within an infrastructure, where the trip of the motor vehicle is guided in an at least semiautomated manner. In accordance with an example embodiment of the present invention, the method includes the following steps:
- receiving regional signals, which represent a first region of the infrastructure monitored with the aid of a surround-sensor system;
- for a motor vehicle, which is guided in an at least semiautomated manner and is approaching the first region, determining if a second region, which is a subregion of the first region or is the first region, is free of a possible collision object for the motor vehicle at an expected arrival time of the motor vehicle at the first or second region, based on the regional signals;
- in the case of a second region free of a possible collision object for the motor vehicle at the expected arrival time, outputting a release signal for transmitting a communications message via a communications network to the motor vehicle, that the second region is free of a possible collision object for the motor vehicle at the expected arrival time.

According to a second aspect of the present invention, a device is provided, which is configured to execute all of the steps of the method according to the first aspect.

According to a third aspect of the present invention, a computer program is provided, which includes commands that, in response to the execution of the computer program by a computer, for example, by the device according to the second aspect, cause it to implement a method according to the first aspect.

According to a fourth aspect of the present invention, a machine-readable storage medium is provided, in which the computer program according to the third aspect is stored.

The present invention is based on the realization that the above-mentioned object may be achieved by monitoring a region of an infrastructure with the aid of a surround-sensor system; on the basis of the monitoring, it being determined whether the region is free of a possible collision object for a motor vehicle approaching the region, at an instant of an expected arrival time of the motor vehicle at the region. If the region is free of a possible collision object at the expected arrival time, this is communicated to the motor vehicle. Thus, this means that in such a case, the motor vehicle receives the information that the region will be free of a possible collision object for the motor vehicle at the expected arrival time. Based on this information, the motor vehicle may then be guided efficiently in an at least semiautomated manner.

If, for example, the motor vehicle guided in an at least semiautomated manner does not receive the information that the region of the infrastructure is free of a possible collision object at the expected arrival time, in this case, the motor vehicle may also be guided efficiently in an at least semiautomated manner on the basis of the absence of this information. For example, the motor vehicle may reduce its speed and/or even stop completely in an at least semiautomated manner.

Thus, in particular, this produces the technical advantage that a motor vehicle may be assisted efficiently during a trip within an infrastructure; the trip being guided in an at least semiautomated manner.

The wording "at least semiautomated control and/or guidance" includes the following cases: semiautomated control and/or guidance, highly automated control and/or guidance, fully automated control and/or guidance, driverless control and/or guidance, remote control of the motor vehicle.

Semiautomated control and/or guidance means that in a specific application (for example: driving on an expressway, driving within a parking lot, passing an object, driving within a traffic lane, which is defined by lane markings), longitudinal and lateral guidance of the motor vehicle are controlled automatically. A driver of the motor vehicle does not have to manually control the longitudinal and lateral guidance of the motor vehicle himself/herself. However, the driver must monitor the automatic control of the longitudinal and lateral guidance continuously, in order to be able to manually intervene, if necessary.

Highly automated control and/or guidance means that in a specific application (for example: driving on an expressway, driving within a parking lot, passing an object, driving within a traffic lane, which is defined by lane markings), longitudinal and lateral guidance of the motor vehicle are controlled automatically. A driver of the motor vehicle does not have to manually control the longitudinal and lateral guidance of the motor vehicle himself/herself. The driver does not have to monitor the automatic control of the longitudinal and lateral guidance continuously, in order to be able to intervene manually, as required. If necessary, a take-over request to the driver for assuming the control of the longitudinal and lateral guidance is outputted automatically. Thus, the driver must be potentially able to take over the control of the longitudinal and lateral guidance.

Fully automated control and/or driving means that in a specific application (for example: driving on an expressway, driving within a parking lot, passing an object, driving within a traffic lane, which is defined by lane markings), longitudinal and lateral guidance of the motor vehicle are controlled automatically. A driver of the motor vehicle does not have to manually control the longitudinal and lateral guidance of the motor vehicle himself/herself. The driver does not have to monitor the automatic control of the longitudinal and lateral guidance, in order to be able to intervene manually, as required. In the specific application, the driver is not necessary.

Driverless control and/or guidance means that irrespective of a specific application (for example: driving on an expressway, driving within a parking lot, passing an object, driving within a traffic lane, which is defined by lane markings), longitudinal and lateral guidance of the motor vehicle are controlled automatically. A driver of the motor vehicle does not have to manually control the longitudinal and lateral guidance of the motor vehicle himself/herself. The driver does not have to monitor the automatic control of the longitudinal and lateral guidance, in order to be able to intervene manually, as required. Thus, the longitudinal and lateral guidance of the vehicle are controlled automatically, for example, in the case of all types of roads, speed ranges and environmental conditions. Therefore, the complete driving task of the driver is assumed automatically. Thus, the driver is no longer necessary. Consequently, the motor vehicle may also travel without a driver from an arbitrary starting position to an arbitrary destination position. Potential problems are solved automatically, that is, without the help of the driver.

Remote control of the motor vehicle means that lateral and longitudinal guidance of the motor vehicle are controlled remotely. This means, for example, that remote-control signals for controlling the lateral and longitudinal guidance remotely are transmitted to the motor vehicle. The remote control is carried out, for example, with the aid of a distant remote-control device.

In the spirit of the description herein, an infrastructure is, for example, a traffic infrastructure. In the spirit of the description herein, a traffic infrastructure includes, for example, one or more roads, in general, traffic routes. In the spirit of the description herein, a traffic infrastructure includes, for example, one or more traffic junctions, that is, one or more road intersections.

In the sense of the description herein, a region is, for example, a traffic junction and/or a road nodal point. A road nodal point is, for example, an intersection or a junction of roads. Thus, this means that a road nodal point may be an intersection. A road nodal point is, for example, a grade crossing, a highway intersection, a highway merging point, a traffic circle, a highway on-ramp, or a highway exit.

In one specific embodiment of the present invention, a motion of the motor vehicle is predicted, in order to ascertain the expected arrival time.

This produces, for example, the technical advantage that the expected arrival time may be ascertained efficiently.

According to a further specific embodiment of the present invention, kinematic signals are received, which represent one or more kinematic variables of the motor vehicle; the prediction being made on the basis of the kinematic signals.

The technical advantage of this is, for example, that the prediction may be made efficiently.

In the spirit of the description herein, a kinematic variable is, for example, one of the following climatic variables: location or position of the motor vehicle, speed of the motor vehicle, and acceleration of the motor vehicle.

According to one specific embodiment of the present invention, historic traffic-state signals are received, which represent a historic traffic state of the second region at a time of day corresponding to the expected arrival time; the determination as to whether the second region is free of a possible collision object for the motor vehicle at the expected arrival time of the motor vehicle at the second region, is carried out on the basis of historic traffic-state signals.

A technical advantage of this is, for example, that the determination may be carried out efficiently.

In addition, the use of historical traffic-state signals has the technical advantage that, for example, an analysis of the regional signals may be carried out efficiently. If, for example, a possible collision object has been detected on the basis of the regional signals, this may be checked for plausibility, for example, using historical traffic-state signals. For if, e.g., in the past, a multitude of motor vehicles traveled inside of this region at this time of day, then the possible collision object currently detected has a high probability of being real.

In another specific embodiment of the present invention, the determination as to whether the second region is free of a possible collision object for the motor vehicle at the expected arrival time of the motor vehicle, includes processing of the regional signals, in order to detect a possible collision object; in response to detection of a possible collision object, a motion of the detected, possible collision object being predicted on the basis of the regional signals, in order to determine if the detected, possible collision object will still be inside of the second region at the expected arrival time.

A technical advantage of this is, for example, that the determination may be carried out efficiently.

According to a further specific embodiment of the present invention, if the detected, possible collision object will still be inside of the second region at the expected arrival time, then, based on the prediction of the detected, possible collision object, the time, at which the detected, possible collision object will leave the second region, is ascertained; on the basis of the ascertained time, driving-behavior signals being generated and outputted, which represent a setpoint driving behavior of the motor vehicle, on the basis of which the motor vehicle is expected to arrive at the first or second region at the ascertained time.

This produces, for example, the technical advantage that the motor vehicle may be assisted efficiently during its trip, which is guided in an at least semiautomated manner. Thus, if the motor vehicle follows the setpoint driving behavior, it will probably arrive at the first and/or second region at the ascertained time. However, the first and/or second region is then expected to be free again of the detected, possible collision object, which means that a collision-free trip of the motor vehicle inside of the region is possible.

In a further specific embodiment of the present invention, the second region is a subregion of the first region, and based on an expected trajectory of the motor vehicle, it is established, in this manner, that the expected trajectory leads through the first region.

A technical advantage of this is, for example, that the determination may be carried out efficiently.

Thus, this means that in this case, only a subregion of the first region is considered, which allows an efficient and rapid analysis of the regional signals.

In the spirit of the description herein, a surround-sensor system includes, for example, one or more surround sensors.

In the spirit of the description herein, surround sensors are positioned, for example, so as to be distributed spatially within the infrastructure.

In the spirit of the description herein, surround sensors are contained by a different or other motor vehicles, which are different from the motor vehicle approaching the region. For example, these other motor vehicles are motor vehicles, which are stopped, for example, parked, around or inside of the region and/or adjacent to the region.

In the sense of the description herein, surround sensors are positioned, for example, so as to be stationary.

In the sense of the description herein, surround sensors are, for example, mobile surround sensors. For example, a surround sensor is mounted on a renamed aircraft, such as a drone.

In the sense of the description herein, a surround sensor is, for example, one of the following surround sensors: video sensor, for example, video sensor of a video camera, radar sensor, lidar sensor, ultrasonic sensor, magnetic field sensor, pressure sensor, and infrared sensor.

Stationary-mounted surround sensors are positioned, for example, on one or more infrastructure elements of the infrastructure.

In the spirit of the description herein, an infrastructure element is, for example, one of the following infrastructure elements: lamp post, road sign, pillar, building, bridge, traffic sign, stake, pole, for example, utility pole, traffic light.

In the sense of the description herein, a surround sensor is, for example, recessed in a road.

Technical functions of the device according to the second aspect of the present invention are derived analogously from corresponding technical functions from the method according to the first aspect, and vice versa.

Therefore, this means that, in particular, device features follow from corresponding method features, and vice versa.

According to one specific embodiment of the present invention, the method according to the first aspect of the present invention is executed with the aid of the device according to the second aspect.

If the term "surround sensor" is singular, the plural shall always be read along with it, and vice versa.

If, for example, the term "collision object" is singular, the plural shall always be read along with it, and vice versa.

Exemplary embodiments of the present invention are represented in the figures and explained in more detail below.

DETAILED DESCRIPTION OF EXAMPLE EMBODIMENTS

Figure 1:
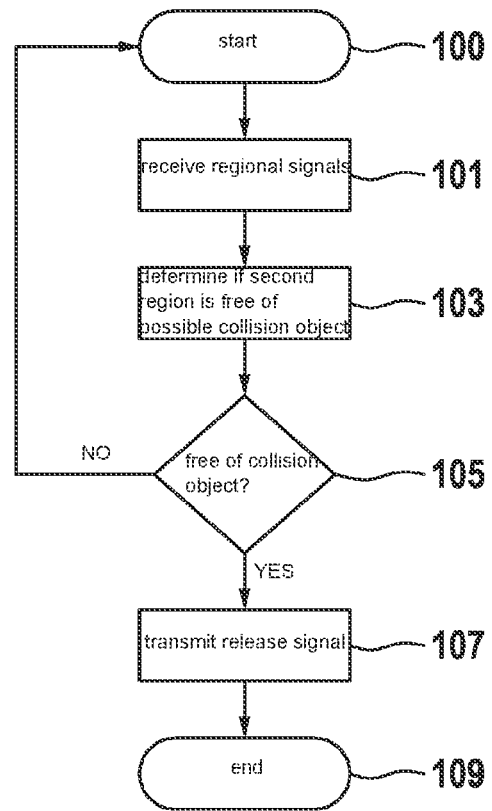
FIG. 1 shows a flow chart of a method for assisting a motor vehicle, in accordance with an example embodiment of the present invention.

FIG. 1 shows a flow chart of a method for assisting a motor vehicle during a trip of the motor vehicle within an infrastructure; the trip of the motor vehicle being guided in an at least semiautomated manner.

The method starts in block 100.

According to a step 101, regional signals are received, which represent a first region of the infrastructure monitored with the aid of a surround-sensor system.

Therefore, this means that the regional signals include, for example, surround-sensor signals from the one or more surround sensors of the surround-sensor system.

In a step 103, for a motor vehicle approaching the first region in an at least semiautomated manner, it is determined if a second region, which is a subregion of the first region or is the first region, is free of a possible collision object for the motor vehicle at an expected arrival time of the motor vehicle at the first or second region, based on the regional signals.

In a step 105, a result of the determination is checked to see if the result specifies whether or not the second region is free of a possible collision object.

If the result specifies that the second region is not free of a possible collision object for the motor vehicle, the method is interrupted at this point and starts again, for example, at block 100.

If the result specifies that the second region is free of a possible collision object for the motor vehicle at the expected arrival time of the motor vehicle, then, according to a step 107, a release signal for transmitting a communications message to the motor vehicle via a communications network, that the second region is free of a possible collision object for the motor vehicle at the expected arrival time, is outputted.

For example, the release signal is outputted to a communications interface, which, in response to the release signal, transmits the communications message to the motor vehicle via the communications network.

In one specific embodiment, the step of transmitting the communications message is included in the method.

In the spirit of the description, a communications network includes, for example, a cellular network and/or a WLAN communications network.

The method then ends at block 109.

The motor vehicle, which is approaching the first region of the infrastructure, guided in an at least semiautomated manner, receives the communications message and may then plan and/or carry out its trip through the first region efficiently.

If the second region is not free of a possible collision object at the expected arrival time, the motor vehicle will not receive a corresponding communications message, since such a message is also not transmitted.

In this case, the motor vehicle guided in an at least semiautomated manner may reduce its speed and/or even stop completely. In this manner, a risk of collision with the possible collision object may be reduced efficiently.

Figure 2:
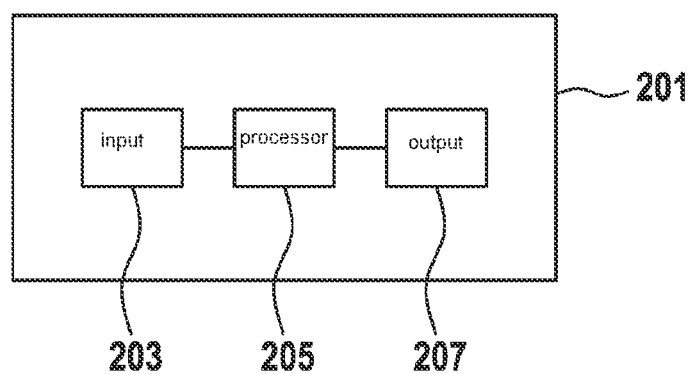
FIG. 2 shows a device in accordance with an example embodiment of the present invention.

FIG. 2 shows a device 201.

Device 201 is configured to execute all of the steps of the method according to the first aspect.

Device 201 includes an input 203, which is configured to receive the regional signals described above.

Device 201 includes a processor 205, which is configured to execute the determining step described above.

Device 201 includes an output 207, which is configured to execute the above-described step of outputting the release signal.

In one specific embodiment of the present invention, a communications interface is provided, which may be contained, for example, by device 201; the communications interface being configured to receive the release signal from processor 205. In response to receiving the release signal, the communications interface is configured, for example, to transmit the communications message to the motor vehicle via a communications network.

In one specific embodiment of the present invention, a plurality of processors are provided in place of the one processor 205.

Figure 3:
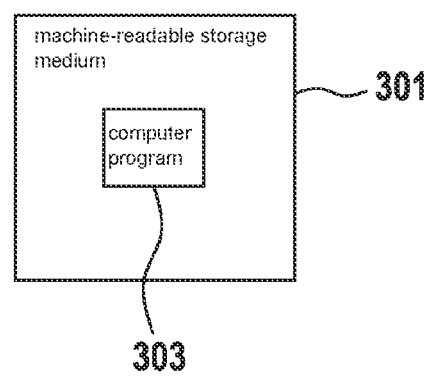
FIG. 3 shows a machine-readable storage medium in accordance with an example embodiment of the present invention.

FIG. 3 shows a machine-readable storage medium 301.

A computer program 303 according to the third aspect is stored in machine-readable storage medium 301.

Figure 4:
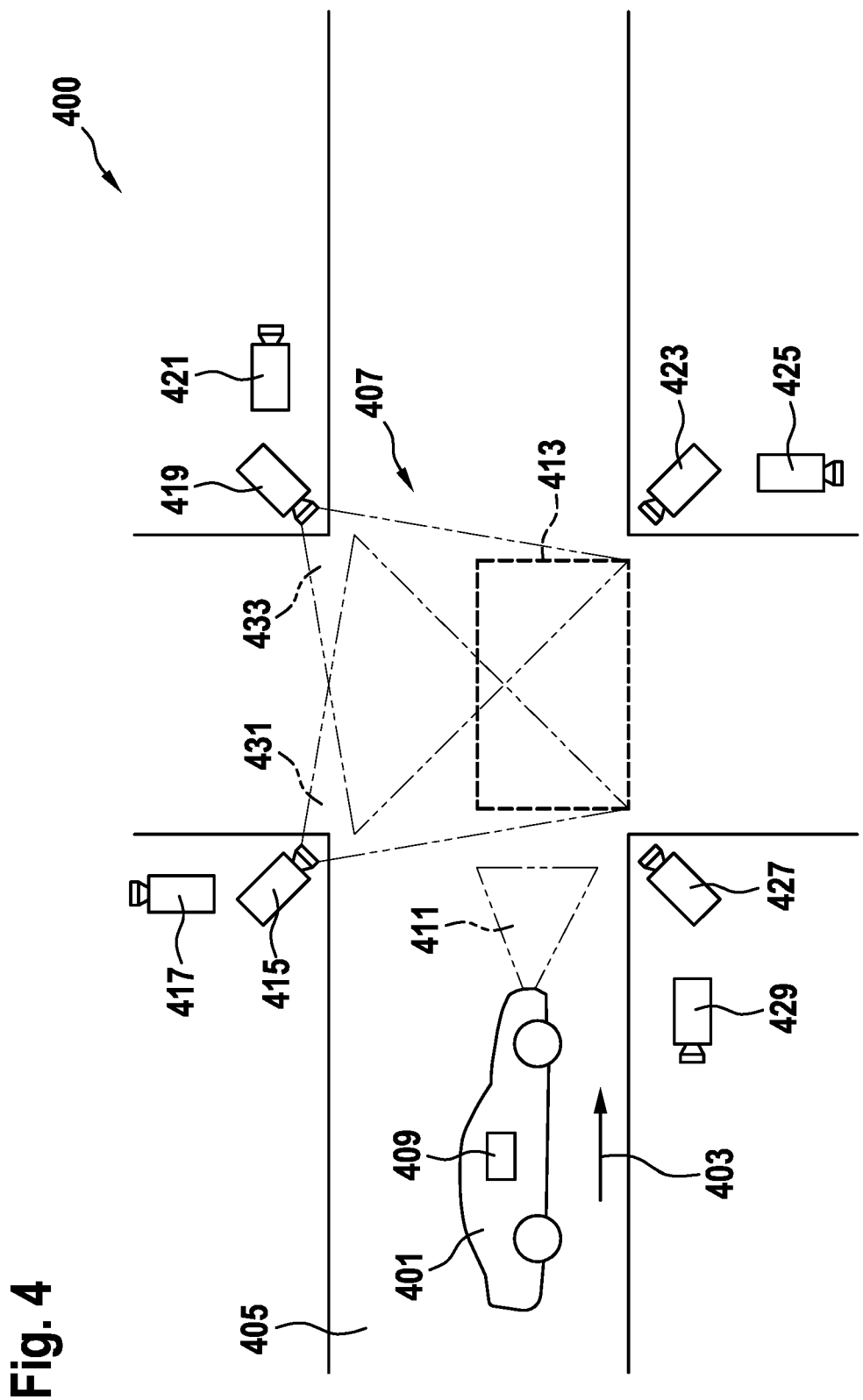
FIG. 4 shows a motor vehicle, which is approaching an intersection, in accordance with an example embodiment of the present invention.

FIG. 4 shows a motor vehicle 401, which is guided in an at least semiautomated manner.

A direction of travel of motor vehicle 401 is represented symbolically by an arrow having the reference numeral 403.

Motor vehicle 401 drives in direction of travel 403, on a road 405, in the direction of an intersection 407, which is part of an infrastructure 400.

Motor vehicle 401 includes a video sensor 409. A detecting range of video sensor 409 is represented by reference numeral 411.

In this context, detecting range 411 of video sensor 409 is such, that the entire region of the intersection may not be monitored, if motor vehicle 401 is still at a certain distance from the region of the intersection. Thus, this means that upon its approach of intersection 407, motor vehicle 401 is lacking information as to whether intersection 407 is free or occupied.

A region relevant to the trip of the motor vehicle 401 guided in an at least semiautomated manner is represented symbolically with the aid of a dashed rectangle having the reference numeral 413. This region 413 is located in the region of the intersection and lies on an expected trajectory of motor vehicle 401.

Since motor vehicle 401 may not monitor this region 413 with the aid of its own surround sensor, the video sensor 409, it has to rely on external information in this regard.

The example embodiment described here is now based on the fact that external surround sensors take on this task.

According to FIG. 4, a plurality of video cameras each including a video sensor are provided in the region of the intersection; the video cameras being able to monitor a surrounding area of the region of the intersection, that is, intersection 407. The plurality of video cameras are part of a surround-sensor system.

In particular, a first video camera 415, a second video camera 417, a third video camera 419, a fourth video camera 421, a fifth video camera 423, a sixth video camera 425, a seventh video camera 427, and an eighth video camera 429 are provided.

At this point, it is noted that the number of video cameras shown here is to be understood as merely illustrative.

Detecting ranges of first video camera 415 and third video camera 419 are shown by way of example. A detecting range of first video camera 415 is denoted by reference numeral 431. A detecting range of third video camera 419 is denoted by reference numeral 433.

The two detecting ranges 431, 433 overlap in the area of the intersection.

First, third, fifth, and seventh video cameras 415, 419, 423, 427 are aligned in the direction of the center of the intersection, so that these video cameras may monitor the region of the intersection.

Second video camera 417, fourth video camera 421, sixth video camera 425, and eighth video camera 429 monitor a section of a road running into intersection 407; the section being behind or facing away from intersection 407.

Thus, this means that eighth video camera 429 monitors road 405 rearwardly with respect to direction of travel 403 of motor vehicle 401.

Thus, these video cameras advantageously provide regional signals, in this case, video signals, which represent a surrounding area of intersection 407, that is, the intersection region itself.

For example, eighth video camera 429 monitors motor vehicle 401 during its approach of intersection 407. For example, a motion of motor vehicle 401 may be predicted on the basis of this monitoring; an expected arrival time of motor vehicle 401 at intersection 407 being able to be determined on the basis of this prediction.

Intersection 407 defines, in particular, a first region in the sense of the description.

Based on the video signals of the video cameras oriented in the direction of the center of the intersection, it is determined if possible collision objects are located within intersection 407 at the expected arrival time of motor vehicle 401 at intersection 407.

If the determination revealed that intersection 407 is free of such possible collision objects, then a communications message, that intersection 407 is free of possible collision objects, is transmitted to motor vehicle 401 via a communications network.

If a possible collision object is detected, then no such communications message is transmitted to motor vehicle 401. For motor vehicle 401, the absence of such a communications message is then the signal, for example, to reduce its speed and/or even to stop completely and/or to output a warning to the driver of motor vehicle 401, which means that he/she must assume complete control again over motor vehicle 401.

Figure 5:
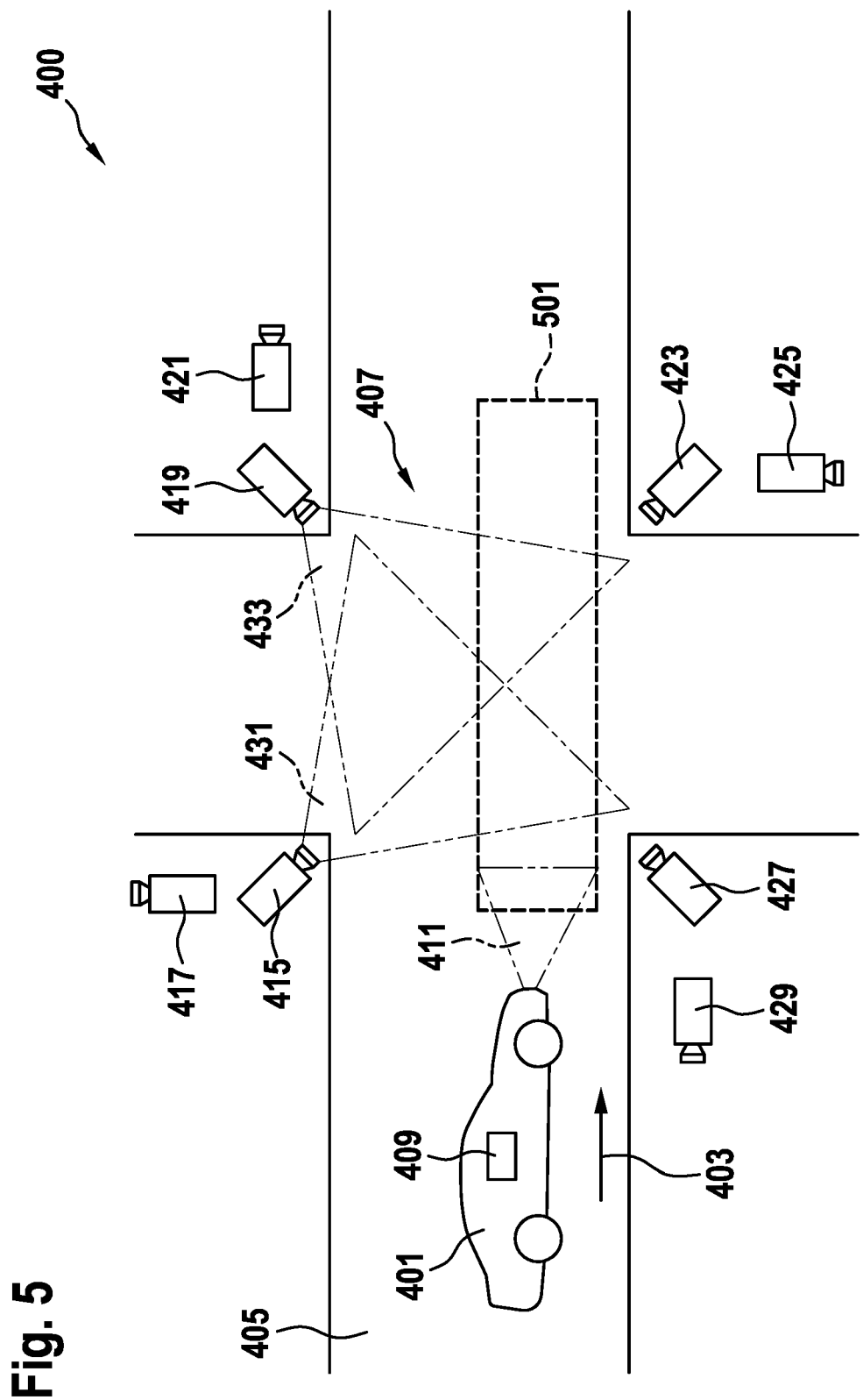
FIG. 5 shows the intersection of FIG. 4, including the approaching motor vehicle.

FIG. 5 shows the intersection 407 according to FIG. 4.

Here, as an addition, a second region 501 is shown, which is a subregion of intersection 407.

Second region 501 lies within a traffic lane, in which motor vehicle 401 will pass through intersection 407. Thus, according to this specific embodiment, only second region 501, that is, the subregion, is relevant, and no longer is the entire region of the intersection.

Figure 6:
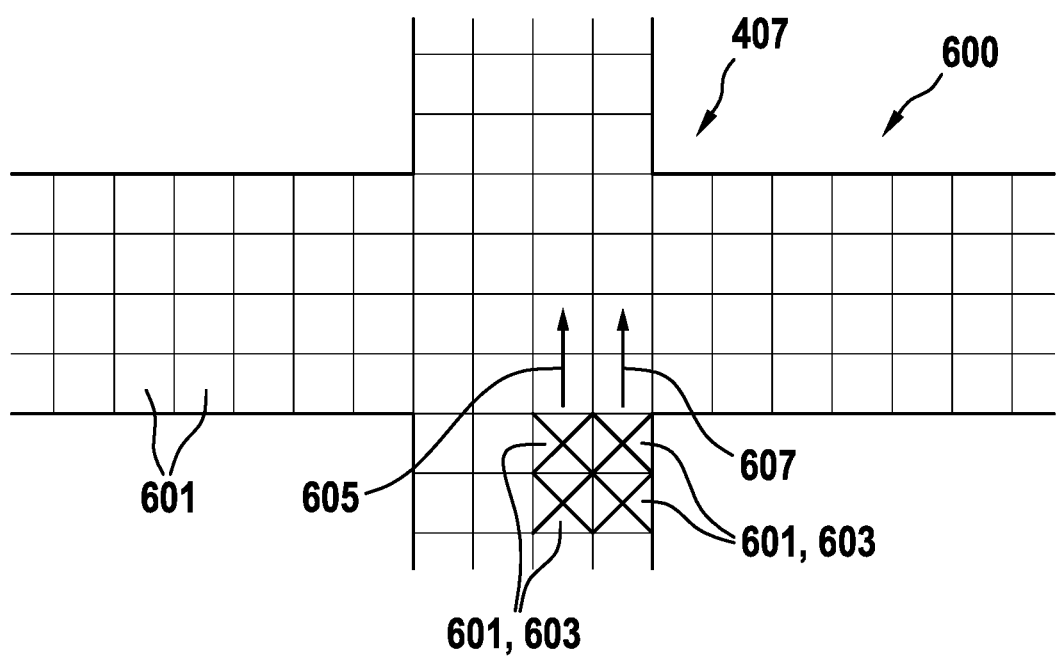
FIG. 6 shows a surrounding-area model of the intersection of FIGS. 4 and 5, in accordance with an example embodiment of the present invention.

FIG. 6 shows a surrounding-area model 600 of intersection 407.

Surrounding-area model 600 intends to subdivide intersection 407 into a plurality of tiles 601 and to determine, for each tile 601, whether or not the tile is occupied by a collision object. For example, in addition to reference numeral 601, occupied tiles are denoted by reference numeral 603.

According to one specific embodiment of the present invention, a specific trajectory 605, 607 is determined for such a possible collision object, in order to make an assertion about this, as to whether the collision object will be in the center of the intersection at the expected arrival time of motor vehicle 401, which is not shown in FIG. 6 for the sake of clarity.

For the sake of clarity, the video cameras are also not shown in FIG. 6.

In summary, the present invention described herein is based on the monitoring of a region, for example, an intersection, of an infrastructure. Based on the monitoring, it is determined if the region is free of a possible collision object at an expected arrival time of a motor vehicle approaching the region. If no possible collision object is in the region of the intersection at the expected arrival time, this is communicated to the motor vehicle, using a communications message. The motor vehicle may then subsequently plan its own driving actions accordingly.

In one specific embodiment of the present invention, only a subrange of the range is analyzed, and a result of the analysis is transmitted to the motor vehicle. The subregion is defined, for example, on the basis of the expected trajectory of the motor vehicle. For example, a traffic lane, in which the motor vehicle will pass through the first region, lies in the second region.

The first and/or second region may be subdivided, for example, into tiles. For each tile, it is checked individually, whether the tile is occupied or free. Occupied tiles are further analyzed, for example, to the effect that the specific motion of the objects corresponding to the occupied tiles is predicted.

In one specific embodiment of the present invention, classical image processing methods are used, in order to detect objects on the basis of the regional signals.

In one specific embodiment of the present invention, in order to detect an object in the first and/or second region, the region, which is represented by the regional signals, is compared to a reference region, in order to be able to ascertain changes.

In one specific embodiment of the present invention, detected objects are classified. A classification is, for example, a classification as to whether the detected object is a person, another motor vehicle, or, for example, a bicycle.

According to one specific embodiment of the present invention, the classification is transmitted to the motor vehicle approaching the region, via the communications network. This allows the motor vehicle to plan its further trip efficiently.

In one specific embodiment of the present invention, driving recommendations (the setpoint driving behavior described above) are ascertained for the motor vehicle approaching the region and transmitted to the motor vehicle via the communications network. A driving recommendation is, for example, a reduction in speed and/or an emergency stop.

What is claimed is:

1. A method for assisting a motor vehicle during a trip of the motor vehicle within an infrastructure, the method comprising:

receiving, via a processor of a device, regional signals, which represent a first region of the infrastructure monitored using a surround-sensor system, the regional signals including surround-sensor signals from one or more surround sensors;

receiving kinematic signals, which represent one or more kinematic variables of the motor vehicle, and predicting a motion of the vehicle based on the kinematic signals;

determining, via the processor of the device, an expected arrival time of the motor vehicle at the first region or a second region, based on the predicted motion of the vehicle;

determining, via the processor of the device, for the motor vehicle, which is guided and is approaching the first region, whether the second region, which is a subregion of the first region or is the first region, is free of a possible collision object for the motor vehicle at the expected arrival time of the motor vehicle at the first or second region, based on the regional signals;

outputting, via an output of the device, based on determining that the second region is free of a possible collision object for the motor vehicle at the expected arrival time at the first or second region, based on the regional signals, a release signal to a communications interface for transmitting a communications message that the second region is free of a possible collision object for the motor vehicle at the expected arrival time, to the motor vehicle via a communications network, wherein the communications network is a cellular network and/or a WLAN communications network;

assisting, via the communications message, operation of the motor vehicle in avoiding an accident; and based on the motor vehicle receiving the communications message that the second region is free of a possible collision object for the motor vehicle at the expected arrival time, the motor vehicle carrying out its trip through the first region in an at least semiautomated guided manner; and wherein the at least one of the first region and the second region is subdivided, via the processor of the device, into square tiles in an intersection area, and wherein it is checked, via the processor of the device, whether each of the square tiles in the intersection area is occupied or free;

wherein the first region of the infrastructure is a traffic junction.

2. The method as recited in claim 1, wherein historic traffic-state signals are received, which represent a historic traffic state of the second region at a time of day corresponding to the expected arrival time, and the determination as to whether the second region is free of a possible collision object for the motor vehicle at the expected arrival time of the motor vehicle at the second region, is carried out based on the historic traffic-state signals.

3. The method as recited in claim 1, wherein the determination as to whether the second region is free of a possible collision object for the motor vehicle at the expected arrival time of the motor vehicle at the second region includes processing of the regional signals to detect a possible collision object, and in response to detection of a possible collision object, a motion of the detected, possible collision object is predicted based on the regional signals, to determine if the detected, possible collision object will still be inside of the second region at the expected arrival time.

4. The method as recited in claim 3, wherein if the detected, possible collision object will still be inside of the second region at the expected arrival time, then, based on the prediction of the detected, possible collision object, a time, at which the detected, possible collision object will leave the second region is ascertained, and based on the ascertained time, driving-behavior signals are generated and outputted, which represent a setpoint driving behavior of the motor vehicle, on the basis of which the motor vehicle is expected to arrive at the first or second region at the ascertained time.

5. The method as recited in claim 1, wherein the second region is a subregion of the first region, and based on an expected trajectory of the motor vehicle, the expected trajectory passes through the first region.

6. An apparatus to assist a motor vehicle during a trip of the motor vehicle within an infrastructure, comprising:

a device configured to perform the following:

receiving, via a processor of the device, regional signals, which represent a first region of the infrastructure monitored using a surround-sensor system, the regional signals including surround-sensor signals from one or more surround sensors;

receiving kinematic signals, which represent one or more kinematic variables of the motor vehicle, and predicting a motion of the vehicle based on the kinematic signals;

determining, via the processor of the device, an expected arrival time of the motor vehicle at the first region or a second region, based on the predicted motion of the vehicle;

determining, via the processor of the device, for the motor vehicle, which is guided and is approaching the first region, whether the second region, which is a subregion of the first region or is the first region, is free of a possible collision object for the motor vehicle at the expected arrival time of the motor vehicle at the first or second region, based on the regional signals; and outputting, via an output of the device, based on determining that the second region is free of a possible collision object for the motor vehicle at the expected arrival time at the first or second region, based on the regional signals, a release signal to a communications interface for transmitting a communications message that the second region is free of a possible collision object for the motor vehicle at the expected arrival time, to the motor vehicle via a communications network, wherein the communications network is a cellular network and/or a WLAN communication network; and assisting, via the communications message, operation of the motor vehicle in avoiding an accident; and based on the motor vehicle receiving the communications message that the second region is free of a possible collision object for the motor vehicle at the expected arrival time, the motor vehicle carrying out its trip through the first region in an at least semiautomated guided manner; and wherein the at least one of the first region and the second region is subdivided, via the processor of the device, into square tiles in an intersection area, and wherein it is checked, via the processor of the device, whether each of the square tiles in the intersection area is occupied or free;

wherein the first region of the infrastructure is a traffic junction.

7. A non-transitory machine-readable storage medium, on which is stored a computer program, which is executable by a processor, comprising:

a program code arrangement having program code for assisting a motor vehicle during a trip of the motor vehicle within an infrastructure, by performing the following:

receiving, via a processor of the device, regional signals, which represent a first region of the infrastructure monitored using a surround-sensor system, the regional signals including surround-sensor signals from one or more surround sensors;

receiving kinematic signals, which represent one or more kinematic variables of the motor vehicle, and predicting a motion of the vehicle based on the kinematic signals;

determining, via the processor of the device, an expected arrival time of the motor vehicle at the first region or a second region, based on the predicted motion of the vehicle;

determining, via the processor of the device, for the motor vehicle, which is guided and is approaching the first region, whether the second region, which is a subregion of the first region or is the first region, is free of a possible collision object for the motor vehicle at the expected arrival time of the motor vehicle at the first or second region, based on the regional signals; and outputting, via an output of the device, based on determining, that the second region is free of a possible collision object for the motor vehicle at the expected arrival time at the first or second region, based on the regional signals, a release signal to a communications interface for transmitting a communications message that the second region is free of a possible collision object for the motor vehicle at the expected arrival time, to the motor vehicle via a communications network, wherein the communications network is a cellular network and/or a WLAN communication network; and assisting, via the communications message, operation of the motor vehicle in avoiding an accident; and based on the motor vehicle receiving the communications message that the second region is free of a possible collision object for the motor vehicle at the expected arrival time, the motor vehicle carrying out its trip through the first region in an at least semi-automated guided manner; and wherein the at least one of the first region and the second region is subdivided, via the processor of the device, into square tiles in an intersection area, and wherein it is checked, via the processor of the device, whether each of the square tiles in the intersection area is occupied or free;

wherein the first region of the infrastructure is a traffic junction.

* * * * *